(12) United States Patent
Fleischer et al.

(10) Patent No.: US 6,719,006 B2
(45) Date of Patent: Apr. 13, 2004

(54) METHOD FOR CONTROLLING PRESSURE IN A HYDRAULIC CIRCUIT

(75) Inventors: Walter Fleischer, Stuttgart (DE); Werner Schmid, Tamm (DE); Christof Ott, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 10/048,736

(22) PCT Filed: Apr. 5, 2001

(86) PCT No.: PCT/DE01/01326

§ 371 (c)(1),
(2), (4) Date: Apr. 29, 2002

(87) PCT Pub. No.: WO01/88650

PCT Pub. Date: Nov. 22, 2001

(65) Prior Publication Data

US 2002/0134228 A1 Sep. 26, 2002

(30) Foreign Application Priority Data

May 18, 2000 (DE) .......................................... 100 24 700

(51) Int. Cl.⁷ ............................................. F15B 13/044
(52) U.S. Cl. ............................... 137/596.17; 251/129.14
(58) Field of Search ................. 137/596.17; 251/129.14

(56) References Cited

U.S. PATENT DOCUMENTS

| 3,399,689 | A | * | 9/1968 | Keane | 137/596.17 |
| 4,369,804 | A | | 1/1983 | Bouvet | |
| 5,588,463 | A | * | 12/1996 | Kervagoret | 137/596.17 |
| 5,836,335 | A | * | 11/1998 | Harms et al. | 137/14 |
| 6,328,065 | B1 | * | 12/2001 | Schmid et al. | 137/596.17 |

FOREIGN PATENT DOCUMENTS

| DE | 197 33 660 A | 2/1999 |
| DE | 198 29 549 A | 12/1999 |
| FR | 2 220 166 A | 9/1974 |

* cited by examiner

*Primary Examiner*—Gerald A. Michalsky
(74) *Attorney, Agent, or Firm*—Michael J. Striker

(57) ABSTRACT

The invention is based on an apparatus (10) for regulating the pressure in a hydraulic circuit that comprises an electrically triggerable pressure-control valve (12), a receptacle device (14) in which the pressure-control valve (12) is installed, and means (54, 64) for damping pressure pulsations. In order to save space, simplify the manufacture of the receptacle device (14), and save additional holding elements, it is proposed according to the invention that the means (54, 64) for damping pressure pulsations be designed as integral components of the pressure-control valve (12).

10 Claims, 2 Drawing Sheets

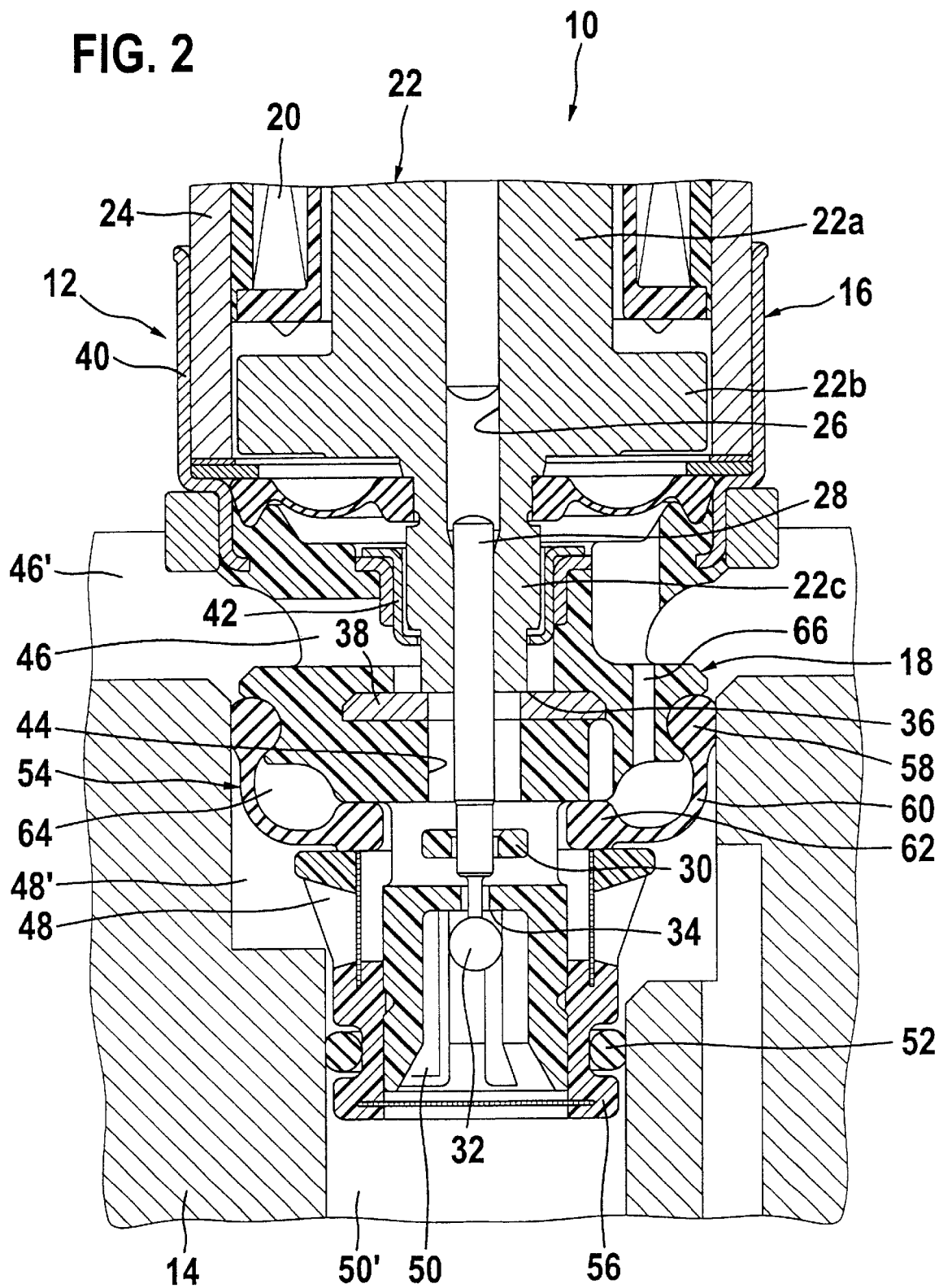

METHOD FOR CONTROLLING PRESSURE IN A HYDRAULIC CIRCUIT

BACKGROUND OF THE INVENTION

The invention is based on an apparatus for regulating the pressure in a hydraulic circuit. Apparatuses of this type are used in automatic gearboxes of motor vehicles in particular, to trigger gear changes via control of the pressure level, for example.

For this, known apparatuses comprise an electrically triggerable pressure-control valve, like the one made known previously in DE 197 33 660 A, for example. This pressure-control valve comprises a solenoid part constructed in conventional fashion having coil, coil core, flux concentrating element and armature, and a hydraulic part having mechanical linkage with the solenoid part. In the hydraulic part, a shutoff element able to be acted upon by the armature controls the flow of hydraulic fluid between inlet passages, working passages, and return passages.

This known pressure-control valve can be installed with its hydraulic part in a receptacle device—a "hydraulic control block"—in which recesses are provided that direct hydraulic fluid and are matched to the corresponding passages of the pressure-control valve. Appropriate devices are provided to dampen pressure pulsations, which can occur during operation of the pressure-control valve in the recess matched to the working passage. These devices are attached in the receptacle device as separate components.

The separate arrangement of the damping devices described is disadvantageous, because it makes a large number of holding elements necessary, takes up a relatively large space, generates additional work, and is costly to install.

SUMMARY OF THE INVENTION

In contrast, an apparatus according to the invention for controlling the pressure in a hydraulic circuit has the advantage that the means for damping pressure pulsations are an integral component of the pressure-control valve. This saves space, simplies the manufacture of the receptacle device, and makes separate holding elements superfluous, without making assembly of the pressure-control valve itself more difficult. The pressure pulsations are damped by means of the invention directly at the site of origin, which greatly improves the damping effect. Due to the damping, the pressure/flow characteristic of a pressure-control valve can be kept within narrow tolerances under nearly all operating conditions. Additionally, the prevention of pressure pulsations has a positive effect on the wearing behavior of the pressure-control valve, so that its service life is extended.

The devices can be integrally molded on one of the sealing elements of the pressure-control valve particularly easily, so that the total number of components to be obstructed remains unchanged. The devices, together with the housing of the pressure-control valve, enclose a damping chamber having a variable volume. Its damping behavior can be varied by means of vents to the recess of the receptacle device matched to the return passage of the pressure-control valve in accordance with the specific case of application. This vent can also be designed in advantageous fashion as throttling point.

BRIEF DESCRIPTION OF THE DRAWING

Exemplary embodiments of the invention are presented in the drawing and explained in greater detail in the following description.

FIGS. 1 and 2 are sectional diagrams of a longitudinal section of two different exemplary embodiments of an apparatus according to the invention.

DESCRIPTION OF THE PREFERRED EMBODIMENTS

Figure 1:
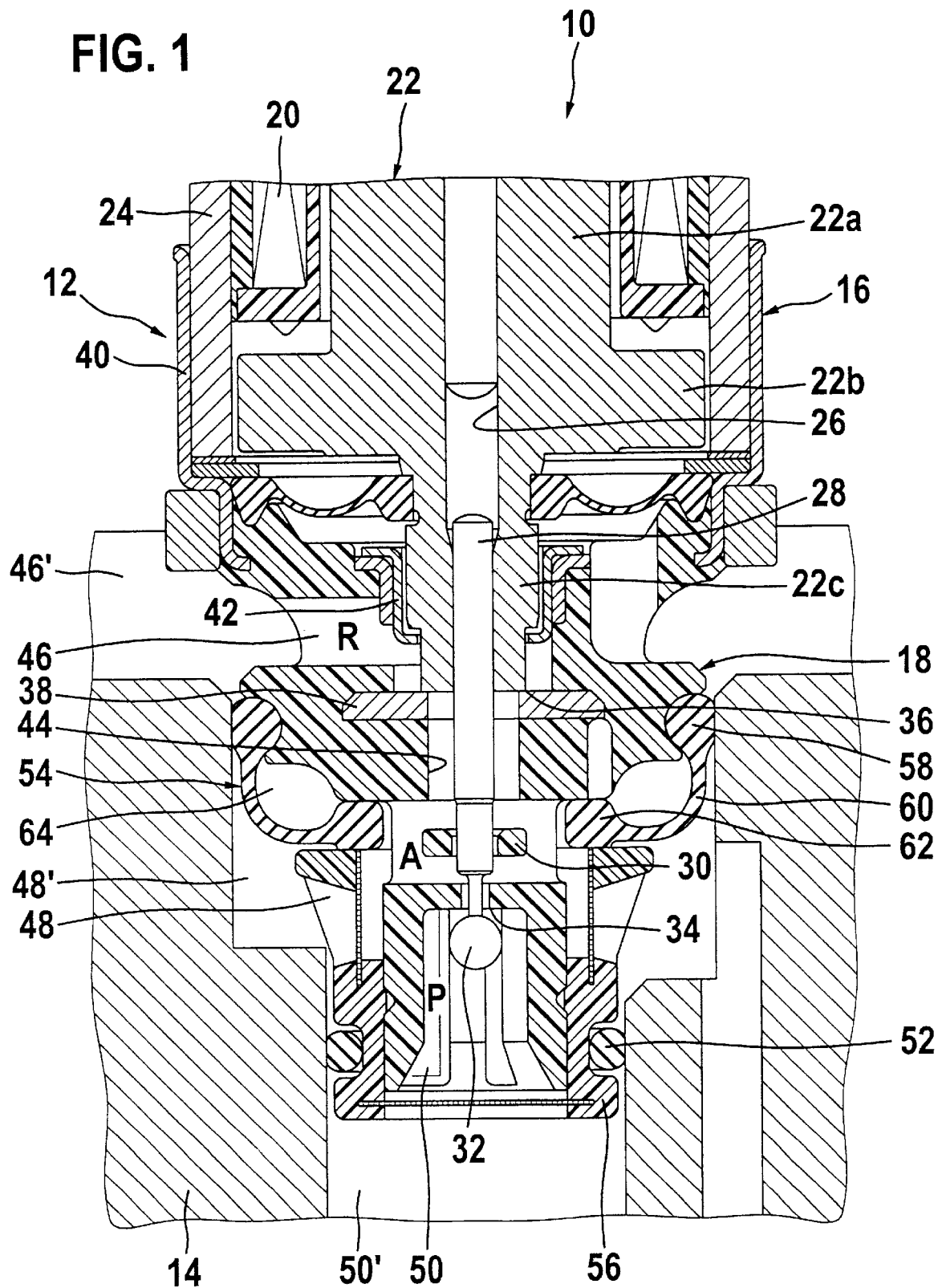

Each of the apparatuses for controlling the pressure in a hydraulic circuit labelled in FIGS. 1 and 2 with the position number 10 comprises an electronically triggerable pressure-control valve 12 and a receptacle device 14 in which this pressure-control valve 12 with its hydraulic part 18 is installed. In addition to its hydraulic part 18, the pressure-control valve 12 also comprises a solenoid part 16. Comprising this solenoid part 16, an electrically triggerable, hollow-cylindrical coil 20, a moveably guided armature 22, and a flux concentrating element 24 surrounding the coil on its circumference are shown in sections.

The armature 22 comprises a section 22a projecting into the interior of the coil 20, a collar 22b adjoining this and spanning the front side of the coil 20, and a neck 22c in axial extension of this collar 22b. A through hole 26 extends through the center of the armature 22, into which a pushrod 28 is pressed in the region of the neck 22c. This pushrod 28 penetrates a guide 30 provided in the hydraulic part 18 and designed in the shape of an eyelet and actuates a shutoff element 32 with its end, the outer diameter of which is tapered. The shutoff element 32 is designed in the shape of a ball and bears against the pushrod 28 as a result of hydraulically-induced forces of flow and pressure. The shutoff element 32 serves to control a first valve seat 34 formed in the hydraulic part 18, the inner diameter of which is greater than the outer diameter of the pushrod 28. An annular orifice therefore exists between pushrod 28 and valve seat 34, through which hydraulic fluid can flow when the valve seat 34 is opened.

A second valve seat 36 of the hydraulic part 18 is formed on a perforated plate 38 that is injected, facing the solenoid part 16, into the hydraulic part 18. This perforated plate 38 is controlled by the front end of the neck 22c and lies in alignment with the first valve seat 34. In the non-energized starting position of the armature 22 shown, the first valve seat 34 is open and the second valve seat 36 is closed. In addition, the armature 22 is moved into the starting position shown by a return device, e.g., in the form of a spring (not shown). Current is not supplied to the coil 20.

The hydraulic part 18 is firmly connected to the solenoid part 16 of the pressure-control valve 12. This solenoid part 16 is manufactured using injection molding technology, preferably using plastic, and comprises an injected holding element 40. The latter is designed in the shape of a sleeve, and its diameter is offset repeatedly. A non-extrusion-coated part of the holding element 40 projects over the hydraulic part 18 and firmly encloses the flux concentrating element 24 of the solenoid part 16. A second guide 42 for the armature 22 is located at the smallest diameter of the holding element 40 lying inside the hydraulic part 18. At the same time, this guide 42 forms an end stop for limiting the up-and-down motion of the armature 22.

A continuous, longitudinal recess 44 extending in the direction of its longitudinal axis is provided at the hydraulic part 18 for directing hydraulic fluid, into which two transverse passages 46, 48, one extending over the top of the other, empty at right angles. The first transverse passage 46 facing the solenoid part 16 is designed in the fashion of a blind hole and forms the return passage R of the pressure-control valve 12, while the transverse passage 48 opposite to the solenoid part 16 penetrates the hydraulic part 18 and acts as the working passage A. The front end of the longitudinal recess 44 forms an inlet passage 50—labelled "P"—for the hydraulic part 18. The latter empties into the working passage A when the valve seat 34 is open, while the hydraulic passage between the working passage A and the return passage R is interrupted. Using an electrically triggered coil 20, these relationships are reversed accordingly, that is, a hydraulic connection exists between the return passage R and the working passage A, while the inlet passage P is blocked.

Recesses 46', 48', 50' of the receptacle device 14 are matched to the passages 46, 48, 50 of the pressure-control valve 12. Sealing elements 52 and 54 are provided on the circumference of the hydraulic part 18 for the mutual sealing of these recesses 46', 48', 50'. The first sealing element 52 separating the inlet passage P from the working passage A is a conventional O-ring that is held on a filter cage 56. The annular filter cage 46 manufactured out of plastic that is resistant to hydraulic fluid is slid onto the end section of the hydraulic part 18 and comprises a filter fabric that covers the opening cross section of the working passage A. This filters contaminants out of the hydraulic fluid flowing out of the working passage A to a hydraulic consuming device (not shown).

The second sealing element 54 serving to separate the working pasage A from the return passage R is composed, according to the invention, of an O-ring cross section 58 having sealing function and an integrally molded diaphragm 60 having a thickened end 62. The sealing element 54 is also produced out of elastic material resistant to hydraulic fluid having good impermeability properties, so that the diaphragm 60 can be stretched using its thickened end 62 between the filter cage 56 and a shoulder of the hydraulic part 18 on the housing side. An annular pressure chamber 64 closed off from the surroundings is thereby produced between the diaphragm 60 and the housing of the hydraulic part 18. The interior space of this pressure chamber 64 is filled with air.

In the installed stated of the pressure-control valve 12 shown, the diaphragm 60 is located in the recess 48' of the receptacle device 14 matched to the working passage A. Due to its malleability and, therefore, the variability of the volume of the pressure chamber 64 enclosed by it, the latter is capable of damping pressure pulsations that can occur in the working passage 48 and the connected recess 48'. Using the sealing element 54 designed according to the invention, therefore, a hydraulic capacity is created in the working passage A without appreciably changing the space required therefore, the number of individual parts or the installation expenditure required. An increase in the stiffness of the diaphragm 60 could be realized, if necessary, by means of a spring element (not shown) that can be located in the interior space of the pressure chamber 64. By varying the spring elements used, a damping characteristic adapted to the specific case of application could be achieved.

The second exemplary embodiment according to FIG. 1 differs from the first exemplary embodiment by the fact that the pressure chamber 60—the volume of which can be changed—is connected to the recess 46' of the receptacle device 14 matched to the return passage R of the pressure-control valve 12 via a vent 66. As a further actuating variable on the damping characteristic, the vent 66 can be designed as damping throttle. It would also be feasible to provide a plurality of such vents 66 or to divide the pressure chamber 64 into multiple sections.

Further-reaching changes or additions to the exemplary embodiments are possible, of course, without deviating from the basic idea of the invention. A 3/2 directional-control proportioning valve is preferably used as the pressure-control valve 12, the armature 22 of which can be moved into any intermediate position by the solenoid part 16. Operating positions can also be described in which both valve seats 34 and 36 are open simultaneously.

What is claimed is:

1. An apparatus (10) for regulating the pressure in a hydraulic circuit having an electrically triggerable pressure-control valve (12) that comprises a solenoid part (16) having an electrically triggerable coil (20), a moveably guided armature (22) and a hydraulic part (18) coupled to the solenoid part (16), in which a shutoff element (32) able to be acted upon by the armature (22) controls the flow of hydraulic fluid between at least one working passage (48) and a return passage (46), and having means (54, 64) for damping pressure pulsations in the working passage (48), wherein the means (54, 64) are an integral component of the pressure-control valve (12) and, in interaction with its housing, limit at least one pressure chamber (64) located on the circumference and having a variable volume.

2. The apparatus according to claim 1, wherein at least one wall of the pressure chamber (64) is formed by an elastically malleable diaphragm (60).

3. The apparatus according to claim 2, wherein the diaphragm (60) is integrally molded on a sealing element (54) of the pressure-control valve (12).

4. The apparatus according to claim 3, wherein the end of the diaphragm (60) located at a distance from the sealing element (54) is fixable with axial separation from this sealing element (54) on the circumference of the pressure-control valve (12).

5. The apparatus according to claim 3, wherein the sealing element (54) forming the diaphragm (60) seals off the return passage (46) and the working passage (48) from each other.

6. The apparatus according to claim 1, wherein the pressure chamber (64) is hermetically sealed off from the surroundings.

7. The apparatus according to claim 1, wherein the pressure chamber (64) is connected to the return passage (46) by means of a vent (66).

8. The apparatus according to claim 7, wherein the vent (66) is outfitted with a damping throttle.

9. The apparatus according to claim 1, wherein the pressure-control valve (12) is designed as a hydraulic 3/2 directional-control proportioning valve that comprises an inlet passage (50) in addition to the working passage (48) and the return passage (46).

10. A control device for an automatic gearbox of a motor vehicle having an apparatus (10) according to claim 1.

* * * * *